(12) United States Patent  (10) Patent No.: US 8,289,473 B2
Kimura et al.  (45) Date of Patent: Oct. 16, 2012

(54) LENS FOR ILLUMINATION, LIGHTING DEVICE, SURFACE LIGHT SOURCE, AND LIQUID-CRYSTAL DISPLAY APPARATUS

(75) Inventors: Syunsuke Kimura, Hyogo (JP); Daizaburo Matsuki, Osaka (JP); Tomoko Iiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 428 days.

(21) Appl. No.: 12/643,328

(22) Filed: Dec. 21, 2009

(65) Prior Publication Data
US 2010/0177262 A1   Jul. 15, 2010

(30) Foreign Application Priority Data
Dec. 22, 2008 (JP) .................................. 2008-326159

(51) Int. Cl.
*G02F 1/1335* (2006.01)
(52) U.S. Cl. .............................. 349/61; 349/62; 359/709
(58) Field of Classification Search .................... 349/61, 349/62; 359/709
See application file for complete search history.

(56) References Cited

U.S. PATENT DOCUMENTS

| | | | |
|---|---|---|---|
| 6,455,834 B2 | 9/2002 | Fujimoto et al. | |
| 6,679,621 B2 | 1/2004 | West et al. | |
| 6,714,323 B1 | 3/2004 | Onishi et al. | |
| 7,254,309 B1 | 8/2007 | Chou et al. | |
| 7,348,723 B2 | 3/2008 | Yamaguchi et al. | |
| 7,411,742 B1* | 8/2008 | Kim et al. ...................... | 359/718 |
| 7,499,228 B2 | 3/2009 | Jeong et al. | |
| 2004/0223315 A1* | 11/2004 | Suehiro et al. ................... | 362/84 |
| 2005/0225988 A1* | 10/2005 | Chaves et al. .................. | 362/332 |
| 2006/0083000 A1* | 4/2006 | Yoon et al. ...................... | 362/311 |
| 2006/0262424 A1* | 11/2006 | Choi ............................... | 359/707 |
| 2007/0109952 A1* | 5/2007 | Jeong et al. ................. | 369/275.4 |
| 2007/0229731 A1* | 10/2007 | Lan et al. ......................... | 349/64 |
| 2008/0297918 A1 | 12/2008 | Park et al. | |

FOREIGN PATENT DOCUMENTS

| | | |
|---|---|---|
| JP | 2000-349971 A | 12/2000 |
| JP | 2001-238048 A | 8/2001 |
| JP | 2003-330109 A | 11/2003 |
| JP | 3875247 B2 | 11/2006 |
| JP | 2007-140524 A | 6/2007 |

* cited by examiner

*Primary Examiner* — Edward Glick
*Assistant Examiner* — Sang Nguyen
(74) *Attorney, Agent, or Firm* — Hamre, Schumann, Mueller & Larson, P.C.

(57) ABSTRACT

A lens for illumination has a light entrance surface and a light exit surface. The light exit surface has a first light exit surface and a second light exit surface. The first light exit surface projects toward a vertex on the optical axis, and the second light exit surface extends outwardly from the periphery of the first light exit surface. The first light exit surface has a shape allowing light that has been emitted from a starting point, which is the position of a light source on the optical axis, at an angle of a specified value or more with respect to the optical axis and reached the first light exit surface to reach a surface to be irradiated by totally reflecting the emitted light at a first point thereon reached by the emitted light first and then refracting the totally reflected light at a second point thereon reached by the emitted light after being totally reflected. The second light exit surface has a shape allowing light that has been emitted from the starting point and reached the second light exit surface to reach the surface to be irradiated by refracting the emitted light at a point thereon reached by the emitted light.

9 Claims, 17 Drawing Sheets

Position on surface to be irradiated

Position on surface to be irradiated

LENS FOR ILLUMINATION, LIGHTING DEVICE, SURFACE LIGHT SOURCE, AND LIQUID-CRYSTAL DISPLAY APPARATUS

BACKGROUND OF THE INVENTION

1. Field of the Invention

The present invention relates to a lens for illumination for widening a range of transmission directions for light from a light source such as a light emitting diode, and to a lighting device using this lens for illumination. The present invention further relates to a surface light source including a plurality of lighting devices, and to a liquid-crystal display apparatus in which this surface light source is disposed behind a liquid-crystal panel to serve as a backlight.

2. Description of Related Art

In a conventional backlight of a large-sized liquid-crystal display apparatus, a number of cold cathode tubes are disposed immediately below a liquid-crystal panel, and these cold cathode tubes are used with other members such as a diffusing plate and a reflecting plate. In recent years, light emitting diodes have been used as light sources for backlights. Light emitting diodes have increased their efficiency recently, and are expected to serve as low-power light sources to replace fluorescent lamps. In the case where light emitting diodes are used as a light source in a liquid-crystal display apparatus, the power consumption of the apparatus can be reduced by controlling the light and dark states of the light emitting diodes according to an image to be displayed.

In a backlight of a liquid-crystal display apparatus using light emitting diodes as a light source, a large number of light emitting diodes are disposed therein instead of cold cathode tubes. The use of a large number of light emitting diodes allows the entire surface of the backlight to have uniform brightness, but the need for such a large number of light emitting diodes is an obstacle to cost reduction. Attempts to increase the output power of each light emitting diode to reduce the required number of light emitting diodes have been made. For example, Japanese Patent No. 3875247 has proposed a lens that is designed to provide a uniform surface light source with a reduced number of light emitting diodes.

In order to obtain a uniform surface light source with a reduced number of light emitting diodes, the area to be irradiated with the light emitted from each light emitting diode needs to be increased. That is, light emitted from each light emitting diode needs to be spread to obtain a wider range of transmission directions for light from the diode. For this purpose, in Japanese Patent No. 3875247, a lens having a circular shape in a plan view is disposed on a light emitting diode as a chip to control the directivity of the chip. The light exit surface of this lens, through which light exits the lens, has a shape such that a portion in the vicinity of the optical axis is a concave and a portion surrounding the concave is a convex extending continuously from the concave.

A light emitting diode as a chip emits light mostly in the front direction of the light emitting diode chip. In the lens disclosed in Japanese Patent No. 3875247, light that has been emitted in the front direction of the chip is refracted at the concave surface in the vicinity of the optical axis and diffused, as shown in FIG. 16A. As a result, the surface to be irradiated is illuminated to have a wide illuminance distribution with a reduced illuminance in the vicinity of the optical axis, as shown in FIG. 16B.

A light emitting diode does not emit light from a point but has a light emitting area of a certain size. Light emitted from the peripheral portion of the light emitting area travels along a path different from that of light emitted from the central portion of the light emitting area. In FIG. 16A, the paths of light rays emitted from the central portion of the light emitting area are indicated by solid lines, and the paths of light rays emitted from the peripheral portion of the light emitting area are indicated by dashed lines.

In order to obtain a wider illuminance distribution, it is conceived to reduce the curvature radius of the concave surface in the vicinity of the optical axis. If the curvature radius of the concave surface is reduced, the light rays emitted from the central portion of the light emitting area are incident on the concave surface at larger angles, and as a result, the light rays are refracted greatly to be directed outwardly, as indicated by solid lines in FIG. 17A. The light rays emitted from the peripheral portion of the light emitting area are, however, incident on the concave surface at excessively large angles locally as indicated by dashed lines in FIG. 17A and are totally reflected. Therefore, as shown in FIG. 17B, the illuminance on the surface to be irradiated drops locally, which forms a ring-shaped dark region thereon. As a result, a surface light source using the light emitting diodes has an uneven brightness. As described above, in the lens described in Japanese Patent No. 3875247, there is a limit to a widening of the range of transmission directions for light emitted from the light source due to the total reflection of the light emitted from the peripheral portion of the light emitting area.

SUMMARY OF THE INVENTION

It is an object of the present invention to provide a lens for illumination capable of further widening the range of transmission directions for light from a light source, and to provide a lighting device, a surface light source, and a liquid-crystal display apparatus each including this lens for illumination.

In order to achieve the above object, the present inventors have considered it important, in obtaining a wider range of transmission directions for light from a light source, to distribute radially the intense light that has been emitted in the front direction of the light emitting diode chip, and come up with an idea of distributing radially the light emitted in the front direction of the light emitting diode chip by utilizing intentionally the total reflection of the light. The present invention has been made in view of the above circumstances.

The present invention provides a lens for illumination for spreading light emitted from a light source so that a surface to be irradiated is irradiated with the spread light. The lens includes: a light entrance surface through which the light emitted from the light source enters the lens; and a light exit surface through which the light that has entered the lens exits the lens, the light exit surface being axisymmetric with respect to an optical axis. In this lens for illumination, the light exit surface has a first light exit surface and a second light exit surface. The first light exit surface projects toward a vertex on the optical axis, and the second light exit surface extends outwardly from a periphery of the first light exit surface to form a convex. When a position of the light source on the optical axis is defined as a starting point, the first light exit surface has a shape allowing light that has been emitted from the starting point at an angle of a specified value or more with respect to the optical axis and reached the first light exit surface to reach the surface to be irradiated by totally reflecting the emitted light at a first point thereon reached by the emitted light first and then refracting the totally reflected light at a second point thereon reached by the emitted light after being totally reflected. The second light exit surface has a shape allowing light that has been emitted from the starting point and reached the second light exit surface to reach the surface to be irradiated by refracting the emitted light at a point thereon reached by the emitted light.

The present invention also provides a lighting device including: a light emitting diode for emitting light; and a lens for illumination for spreading light emitted from the light emitting diode so that a surface to be irradiated is irradiated with the spread light. This lens for illumination is the above-mentioned lens for illumination.

The present invention further provides a surface light source including: a plurality of lighting devices arranged in a plane; and a diffusing plate disposed to cover the plurality of lighting devices, and configured to receive on one surface thereof light emitted from the plurality of lighting devices and to emit the light from the other surface thereof in a diffused manner. Each of the plurality of lighting devices is the above-mentioned lighting device.

The present invention still further provides a liquid-crystal display apparatus including: a liquid-crystal panel; and the above-mentioned surface light source disposed behind the liquid-crystal panel.

In the lens for illumination configured as described above, the first light exit surface forms a convex for totally reflecting once the light emitted from the central portion of the light emitting area of the light source and then allowing the totally reflected light to exit the lens therethrough. Therefore, the light emitted from the peripheral portion of the light emitting area of the light source also is totally reflected at the first light exit surface and then reaches the surface to be irradiated. That is, with such a first light exit surface configured as described above, approximately the entire amount of light that has reached the first light exit surface can be directed toward a large area around the optical axis of the lens on the surface to be irradiated. On the other hand, with the second light exit surface forming a convex, light that has reached the second light exit surface can be directed to an area away from the optical axis of the lens on the surface to be irradiated. Accordingly, the present invention makes it possible to obtain a wider range of transmission directions for light from the light source without any conventional constraint, in other words, by distributing effectively the intense light emitted in the front direction of the light source.

DETAILED DESCRIPTION OF THE INVENTION

First Embodiment

Figure 1:
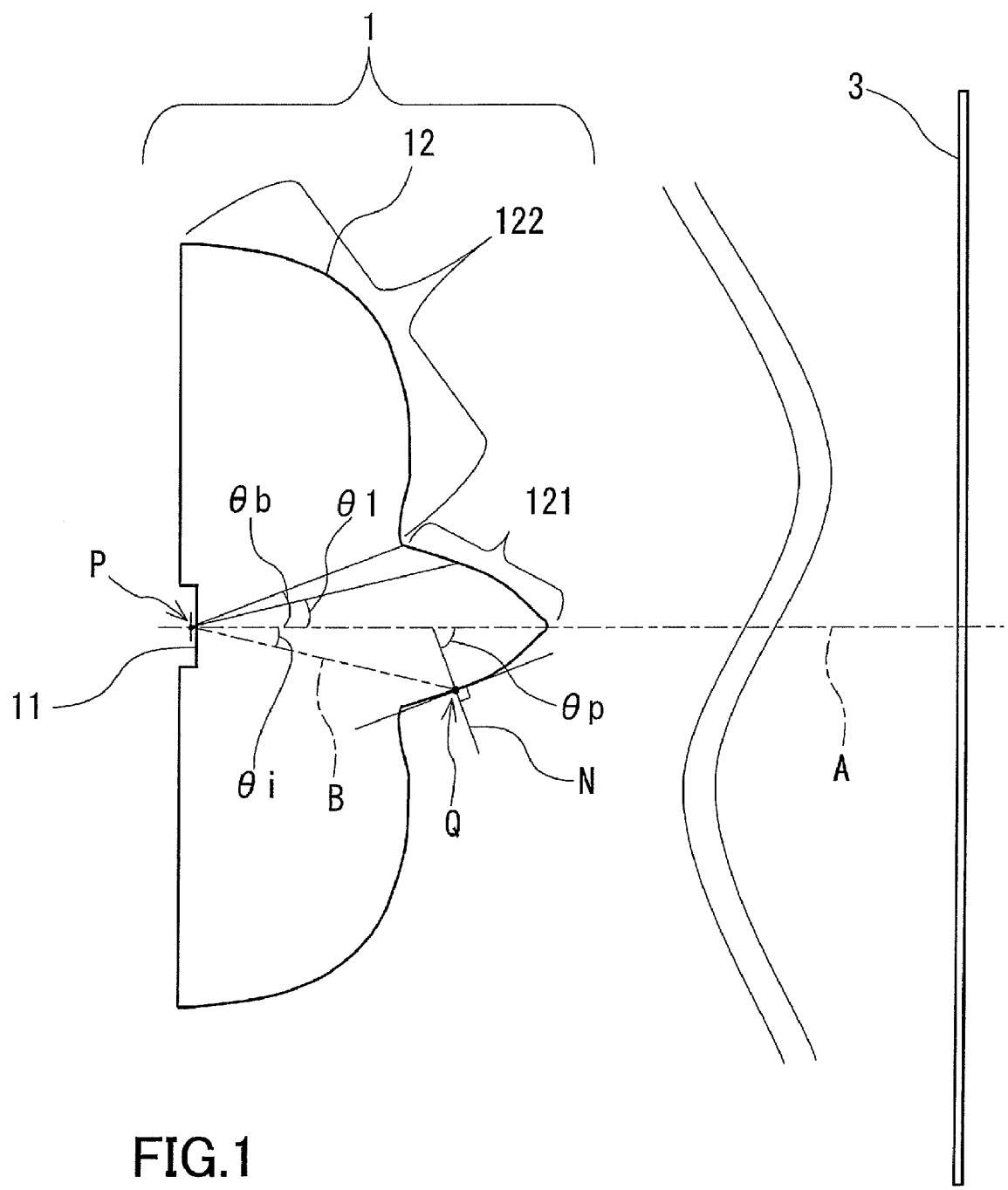
FIG. 1 is a schematic diagram of a lens for illumination according to a first embodiment of the present invention.

A lens for illumination according to the first embodiment of the present invention will be described with reference to the accompanying drawings. FIG. 1 is a schematic diagram of a lens for illumination 1 according to the first embodiment. The lens for illumination 1, which is disposed between a light source (not shown in FIG. 1) having directivity and a surface to be irradiated 3, spreads light emitted from the light source and emits the spread light to the surface to be irradiated 3. That is, the lens for illumination 1 widens the range of transmission directions for light from the light source. In the illuminance distribution on the surface to be irradiated 3, the illuminance is greatest on the optical axis A that is the design center line of the lens for illumination 1 and decreases almost monotonically toward the edge. The light source and the lens for illumination 1 are disposed so that their optical axes coincide with each other.

Specifically, the lens for illumination 1 has a light entrance surface 11 through which the light emitted from the light source enters the lens and a light exit surface 12 through which the light that has entered the lens exits the lens. The light exit surface 12 is axisymmetric with respect to the optical axis A. The contour of the lens for illumination 1 in plan view need not be axisymmetric with respect to the optical axis A. The light entrance surface 11 need not be axisymmetric with respect to the optical axis A. The light emitted from the light source enters the lens for illumination 1 through the light entrance surface 11, exits the lens 1 through the light exit surface 12, and then reaches the surface to be irradiated 3. The light emitted from the light source is spread by the action of the light exit surface 12, and reaches a large area of the surface to be irradiated 3.

As the light source, for example, a light emitting diode can be used. Light emitting diodes usually are chips with a rectangular plate shape. Therefore, it is preferable that the light entrance surface 11 of the lens for illumination 1 have a shape conforming to the shape of a light emitting diode to fit in close contact with the light emitting diode. The light emitting diode is in contact with the light entrance surface 11 of the lens for illumination 1 via a bonding agent, and connected optically to the light entrance surface 11. The light emitting diode usually is covered with a sealing resin to avoid contact with air, but the light emitting diode need not be covered with a sealing resin because the lens for illumination 1 serves as a sealing resin. As a conventional sealing resin for a light emitting diode, an epoxy resin, silicone rubber, or the like is used.

The lens for illumination 1 is made of a transparent material having a specified refractive index. The refractive index of the transparent material is, for example, about 1.4 to 1.5. Examples of such a transparent material include resins such as epoxy resin, silicone resin, acrylic resin, and polycarbonate, and rubbers such as silicone rubber. Particularly, it is preferable to use epoxy resin, silicone rubber, or the like that has been used as a sealing resin for a light emitting diode.

The light exit surface 12 includes a first light exit surface 121 projecting toward a vertex on the optical axis, and a second light exit surface 122 extending outwardly from the periphery of the first light exit surface 121 to form a convex. Light enters the lens for illumination 1 through the light entrance surface 11 at a wide range of angles. Light that has entered the lens at a small angle with respect to the optical axis A reaches the first light exit surface 121, and light that has entered the lens at a larger angle with respect to the optical axis A reaches the second light exit surface 122.

Next, the shapes of the first light exit surface 121 and the second light exit surface 122 will be described. For that purpose, a starting point P is defined first, and then light emitted from the starting point P is assumed. As stated herein, the starting point P is the position of the light source on the optical axis A. In the case where a light emitting diode is used as a light source, the starting point P is the point of intersection of the optical axis A and the light emitting surface that is the front surface of the light emitting diode. That is, the starting point P is spaced from the light entrance surface 11 by the thickness of the above-mentioned bonding agent. When an angle between the optical axis A and a line connecting the starting point P and the boundary between the first light exit surface 121 and the second light exit surface 122 is $\theta b$, light that has been emitted from the starting point P at an angle reaches the first light exit surface 121 or the second light exit surface 122 based on the angle $\theta b$ as a threshold angle.

The first light exit surface 121 has a shape allowing light that has been emitted from the starting point P at an angle of a specified value $\theta f$ or more (see FIG. 5) with respect to the optical axis A and reached the first light exit surface 121 to reach the surface to be irradiated 3 by totally reflecting the emitted light at a first point 131 (see FIG. 3) thereon reached by the emitted light first and then refracting the totally reflected light at a second point 132 (see FIG. 3) thereon reached by the emitted light after being totally reflected. The light that has been emitted from the starting point P at an angle of the specified value $\theta f$ or more with respect to the optical axis A and reached the first light exit surface 121 as mentioned above changes its traveling direction significantly by a single total reflection and a single refraction thereof, and thus the surface to be irradiated is irradiated with this light. Here, it is preferable that the first point 131 and the second point 132 are located on the opposite sides with respect to the optical axis A. That is, it is preferable that the light ray that travels from the first point 131 to the second point 132 intersects the optical axis.

The shape of the first light exit surface 121 also can be represented as follows. As shown in FIG. 1, in the case where an angle between the optical axis A and a light ray B of the light emitted from the starting point P is denoted as $\theta i$ (degrees), an angle (a smaller angle of the two angles) between the optical axis A and a normal N to the light exit surface 12 at an intersection point Q of the light ray B and the light exit surface 12 is denoted as $\theta p$ (degrees), and a refractive index of the lens is denoted as nd, when the intersection point Q is located on the first light exit surface 121 and the angle $\theta i$ is the specified value $\theta f$ or more, the first light exit surface 121 satisfies the following inequality (1):

$$\theta p - \theta i > \sin^{-1}(1/nd) \quad (1).$$

The left side "$\theta p - \theta i$" in the inequality (1) is an angle of incidence of the light on the light exit surface 12 from the starting point P. When the value of the left side is equal to or less than the value of the right side, the light is not totally reflected at the first light exit surface 121.

The angle of the specified value $\theta f$, which is the minimum angle at which the light emitted from the starting point P can be totally reflected at the first exit surface 121, may be approximately 0 degree so that the most part of the light that has been emitted from the starting point P and reached the first light exit surface 121 is totally reflected once at the first light exit surface 121. As stated herein, an angle of approximately 0 degree means an angle of less than 1 degree. In order to achieve this angle, the top of the first light exit surface 121 may be sharpened. With this configuration, the light emitted from the light source can be distributed in a wider area on the surface to be irradiated 3 while reducing the amount of light that reaches the vicinity of the optical axis A thereon.

In order to constitute a surface light source using a plurality of light emitting diodes, the angle of the specified $\theta f$ is preferably 3 to 7 degrees. This is because if the angle $\theta f$ is less than 3 degrees, the area in the vicinity of the optical axis A on the surface to be irradiated 3 becomes too dark, and if the angle $\theta f$ exceeds 7 degrees, the area in the vicinity of the optical axis A on the surface to be irradiated 3 becomes too bright. In either case, it is difficult to obtain a uniform illuminance distribution in the case of a surface light source.

Furthermore, in the case where the angle of the specified value $\theta f$ is 3 to 7 degrees, it is preferable that the first light exit surface 121 has a shape allowing light that has been emitted from the starting point P at an angle of less than the specified value $\theta f$ with respect to the optical axis A and reached the first light exit surface 121 to reach the surface to be irradiated 3 by refracting the emitted light at a point 133 (see FIG. 5) thereon reached by the emitted light. In order to achieve this, the curvature radius of the area in the vicinity of the vertex of the first light exit surface 121 may be increased. With this configuration, the area in the vicinity of the optical axis A on the surface to be irradiated 3 can be illuminated. Accordingly, when a surface light source is constituted, it is possible to reduce uneven brightness in the plane.

In the case where an angle between the optical axis A and a line connecting the starting point P and a point on the first light exit surface 121 is denoted as $\theta 1$, a maximum value of the angle θ1 is denoted as θ1max, and a refractive index of the lens is denoted as nd, the first light exit surface 121 satisfies the following inequality (2):

$$\theta 1max < 90° - \sin^{-1}(1/nd) \quad (2).$$

It should be noted that θ1max is equal to the above-mentioned angle θb. The inequality (2) defines the range of the first light exit surface 121. The inequality (2) defines the range of the first light exit surface 121 with an angle based on the starting point P (polar coordinates), and indicates the range of angles at which the light that has been emitted from the starting point P and reached the first light exit surface 121 can be totally reflected, assuming that the first light exit surface 121 is parallel to the optical axis. When the angle θ1max is equal to or more than the angle in the right side of the inequality (2), the range of the first light exit surface 121 is increased, and the first light exit surface 121, particularly the peripheral portion thereof, does not satisfy the condition of the total reflection.

Preferably, the angle θ1max is 15 to 25 degrees. If the angle θ1max is less than 15 degrees, the effect of the first light exit surface 121 is reduced, and a significant light dispersion effect cannot be obtained. If the angle θ1max exceeds 25 degrees, the area in the vicinity of the optical axis A on the surface to be irradiated 3 becomes too bright.

On the other hand, the second light exit surface 122 has a shape allowing light that has been emitted from the starting point P and reached the second light exit surface 122 to reach the surface to be irradiated 3 by refracting the emitted light at a point 14 (see FIG. 4) thereon reached by the emitted light. The angle between the optical axis A and the light emitted from the starting point P increases toward the outer edge of the second light exit surface 122. The angle of the light ray B emitted from the starting point P with respect to a normal N at the point 14 on the second light exit surface 122 reached by the emitted light ray B (that is, θp−θi) is the incident angle of the light ray B with respect to the second light exit surface 122. An excessively large incident angle causes total reflection. The incident angle needs to be kept small in order to prevent total reflection. Accordingly, the second light exit surface 122 has a shape such that the angle θp between the normal N and the optical axis A increases with increasing distance from the optical axis A. That is, the shape of the second light exit surface 122 is a convex. The sign of the angle θp is positive in the case where the portion of the normal N extending toward the inside of the lens intersects the optical axis A, and negative in the case where the portion of the normal N extending toward the outside of the lens intersects the optical axis A.

Figure 3:
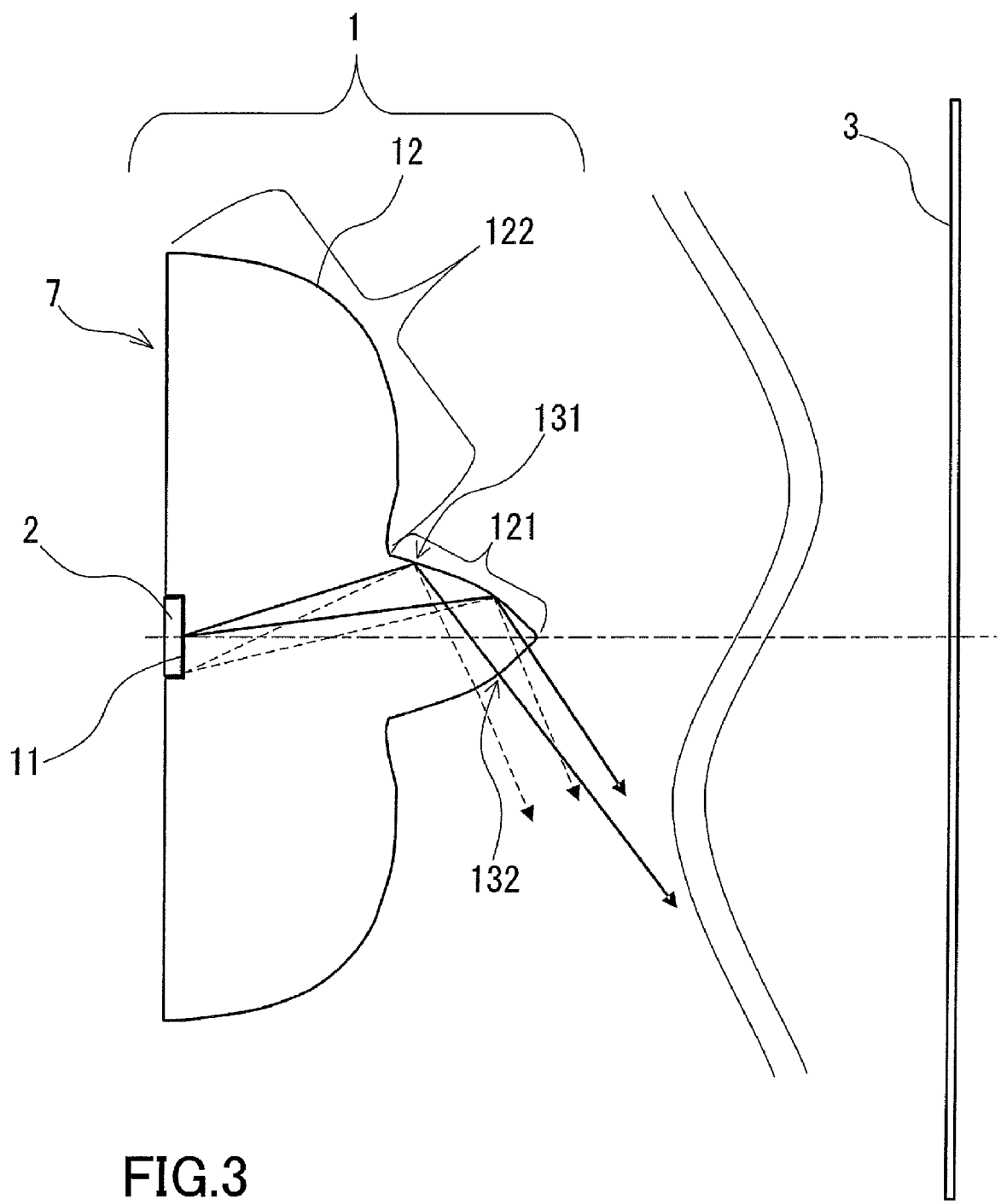
FIG. 3 is a diagram showing optical paths of light rays that exit the lens through a first light exit surface of the lighting device according to the second embodiment of the present invention.

As described above, the first light exit surface 121 is a convex capable of totally reflecting once light rays emitted from the central portion of the light emitting area of the light source and then allowing the totally reflected light rays to exit the lens, as indicated by solid lines in FIG. 3. Therefore, light rays emitted from the peripheral portion of the light emitting area of the light source also are totally reflected at the first light exit surface 121 and then reach the surface to be irradiated 3, as indicated by dashed lines in FIG. 3. That is, with the first light exit surface 121, approximately the entire amount of the light that has reached the first light exit surface 121 can be directed toward a larger area around the optical axis A of the lens on the surface to be irradiated 3. On the other hand, with the second light exit surface 122 forming a convex, the light that has reached the second light exit surface 122 can be directed to an area away from the optical axis of the lens on the surface to be irradiated 3. Accordingly, with the lens for illumination 1 of the first embodiment, the range of transmission directions for light from the light source can be widened further without any conventional constraint, in other words, by distributing the intense light emitted in the front direction of the light source effectively.

The lens for illumination of the present invention also is applicable to light sources (such as lasers) as well as light emitting diodes.

Second Embodiment

Figure 2:
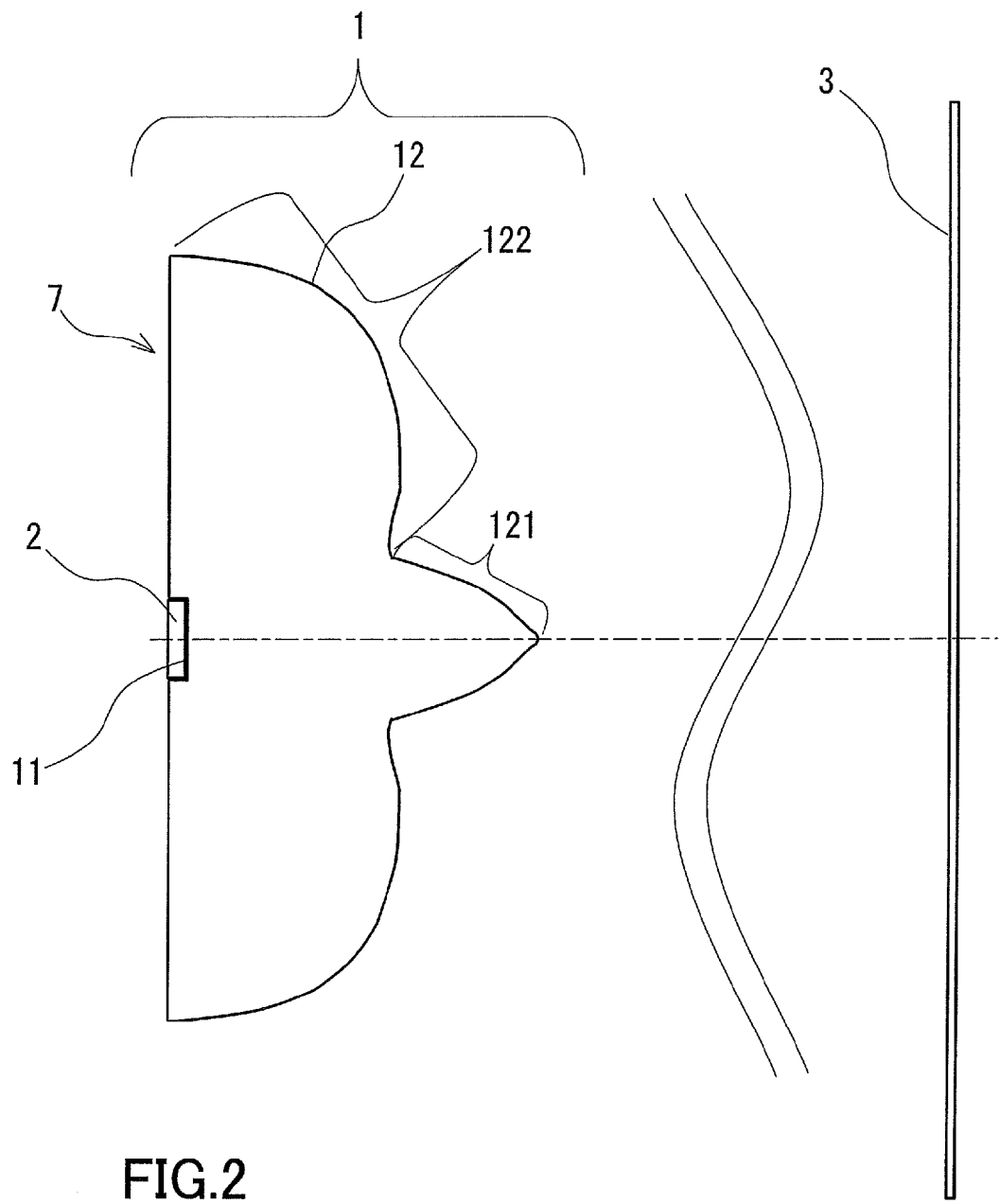
FIG. 2 is a schematic diagram of a lighting device according to a second embodiment of the present invention.

FIG. 2 is a schematic diagram of a lighting device 7 according to a second embodiment of the present invention. This lighting device 7 includes a light emitting diode 2 for emitting light, and a lens for illumination 1 described in the first embodiment for spreading light emitted from the light emitting diode 2 so that the surface to be irradiated 3 is irradiated with the spread light.

The light emitting diode 2 is in contact with the light entrance surface 11 of the lens for illumination 1 via a bonding agent, and connected optically to the light entrance surface 11. The light that has exited the lens for illumination 1 through the light exit surface 12 reaches the surface to be irradiated 3, and thus the surface to be irradiated 3 is illuminated with that light.

Light generation in the light emitting diode 2 has no directivity in itself, and a light emitting region has a refractive index of at least 2.0. When light from the light emitting region enters a low refractive region, the refraction of the light at the interface causes the light to have the maximum intensity in the normal direction of the interface and to have a lower intensity as the angle of the light with respect to the normal increases. As described above, since the light emitting diode 2 has high directivity, it is necessary to widen the range of transmission directions for light therefrom using the lens for illumination 1 to illuminate a larger area.

FIG. 3 is a diagram showing the paths of light rays in the lighting device 7. In FIG. 3, the paths of light rays that are emitted from the light source at small angles and reach the first light exit surface 121 are described. The light that has been emitted from the light emitting diode 2 passes through the light entrance surface 11 and reaches the first light exit surface 121. A point on the first light exit surface 121 reached by the emitted light is the first point 131. The light emitted from the light emitting diode 2 is incident at the first point 131 on the first light exit surface 121 at a large angle. Therefore, the entire amount of the incident light is reflected and does not pass through the first light exit surface 121. The reflected light intersects the optical axis and reaches the first light exit surface 121 again. A point on the first light exit surface 121 reached by the emitted light again is the second point 132. The light reflected at the first point 131 is incident at the second point 132 on the first light exit surface 121 at a smaller angle. Therefore, the light passes through the first light exit surface 121 while being refracted. The light that has passed through the first light exit surface 121 reaches the surface to be irradiated 3.

Figure 4:
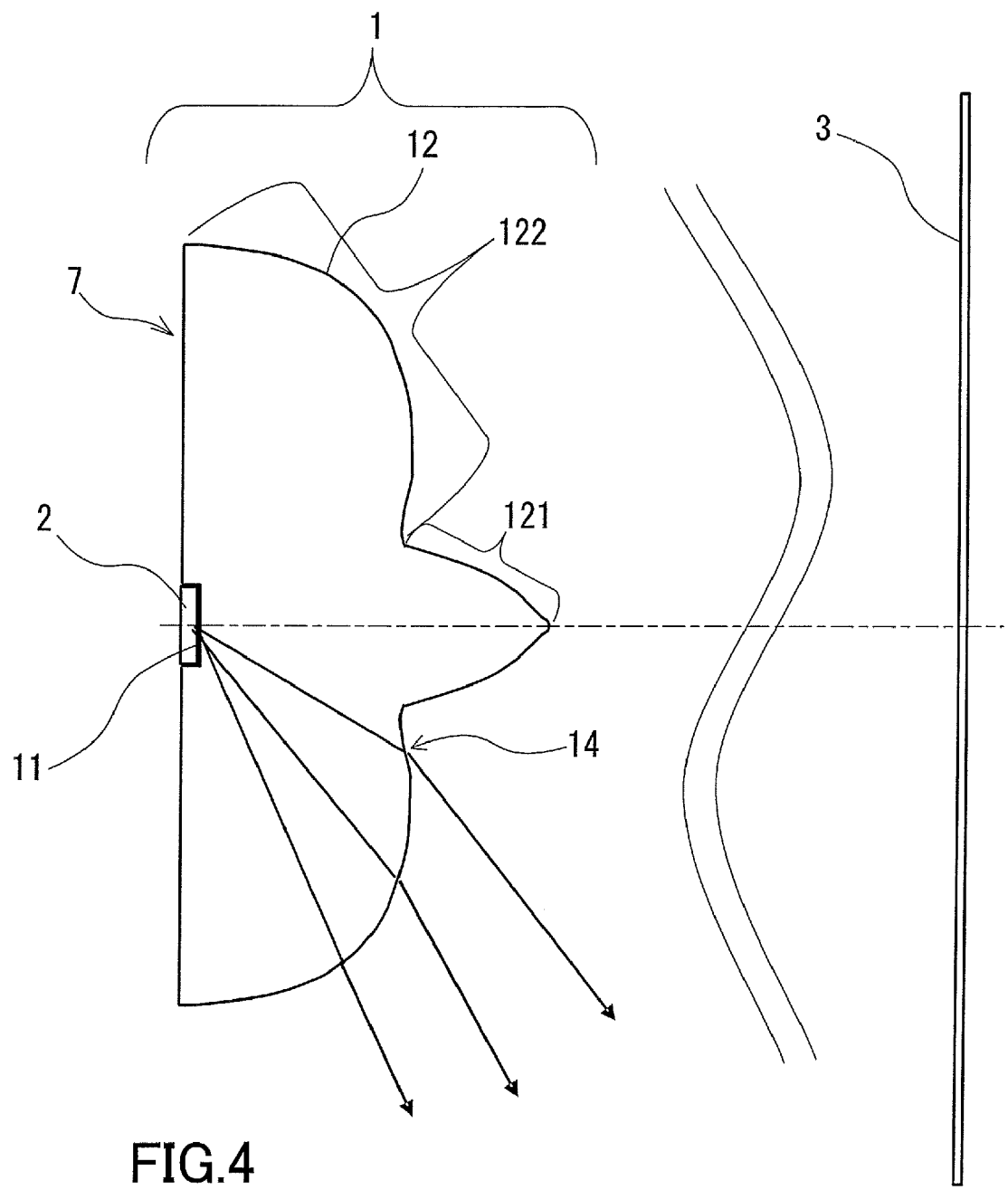
FIG. 4 is a diagram showing optical paths of light rays that exit the lens through a second light exit surface of the lighting device according to the second embodiment of the present invention.

FIG. 4 is a diagram showing the paths of light rays in the lighting device 7. In FIG. 4, the paths of light rays that are emitted from the light source at large angles and reach the second light exit surface 122 are described. The light that has been emitted from the light emitting diode 2 passes through the light entrance surface 11 and reaches the second light exit surface 122. The light that has reached the second light exit surface 122 passes through it while being refracted, and then reaches the surface to be irradiated 3.

Figure 5:
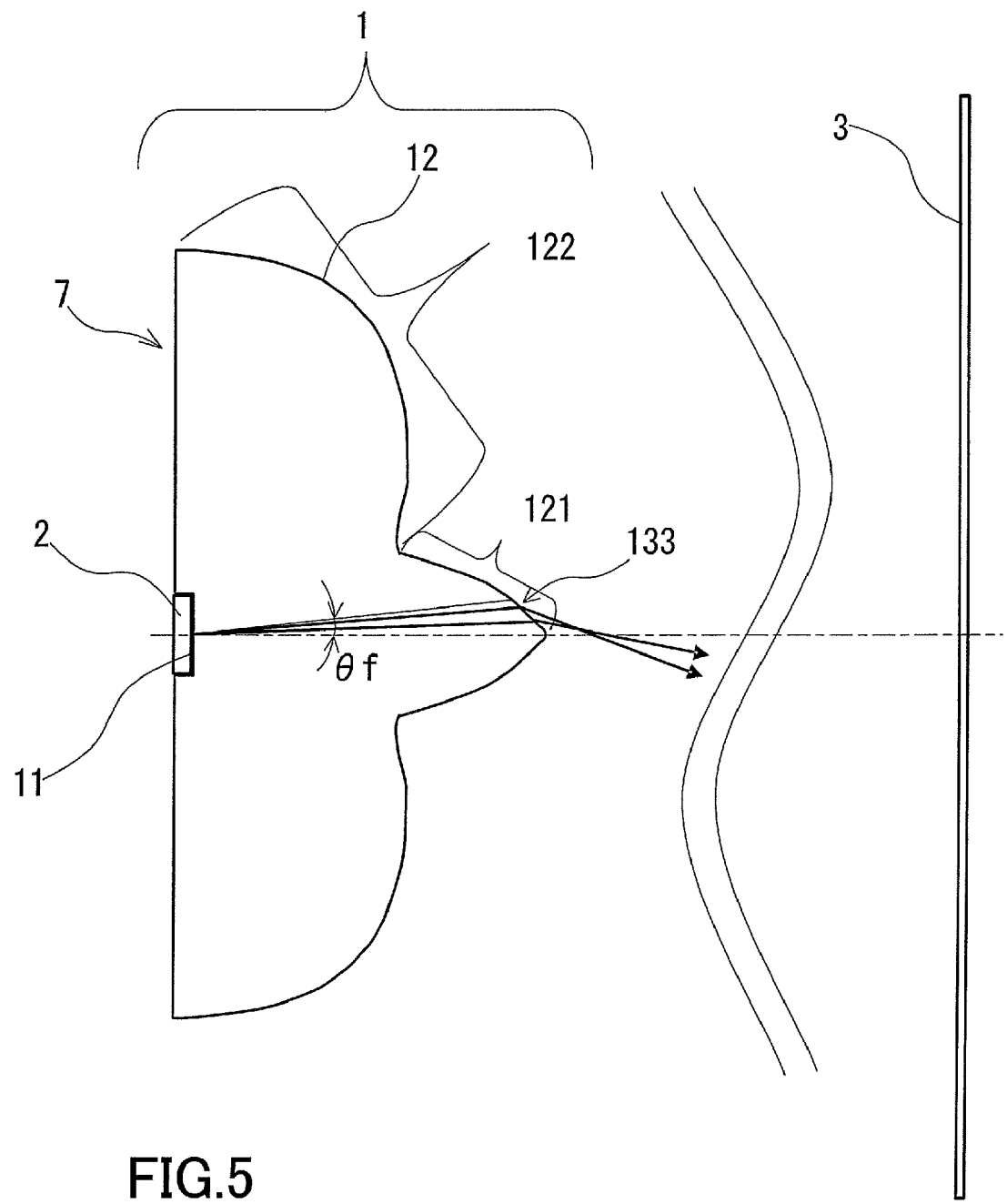
FIG. 5 is a diagram showing optical paths of light rays that exit the lens through an area near the optical axis on the first light exit surface of the lighting device according to the second embodiment of the present invention.

FIG. 5 is a diagram showing the paths of light rays in the lighting device 7. In FIG. 5, the paths of light rays that are emitted from the light source at smaller angles in the vicinity of the optical axis and reach the first light exit surface 121 are described. The light that has been emitted from the light emitting diode 2 passes through the light entrance surface 11, and reaches the first light exit surface 121. The light that has reached the first light exit surface 121 passes through it while being refracted, and then reaches the surface to be irradiated 3. As described above, the light that has been incident on the area near the optical axis on the first light exit surface 121 is not totally reflected, but passes through the first light exit surface 121 while being refracted and reaches the surface to be irradiated 3. As a result, the illuminance in the area near the optical axis on the surface to be irradiated 3 can be prevented from being reduced more than necessary.

Hereinafter, Example 1 is given as a specific numerical example of the present invention.

Example 1

Figure 6:
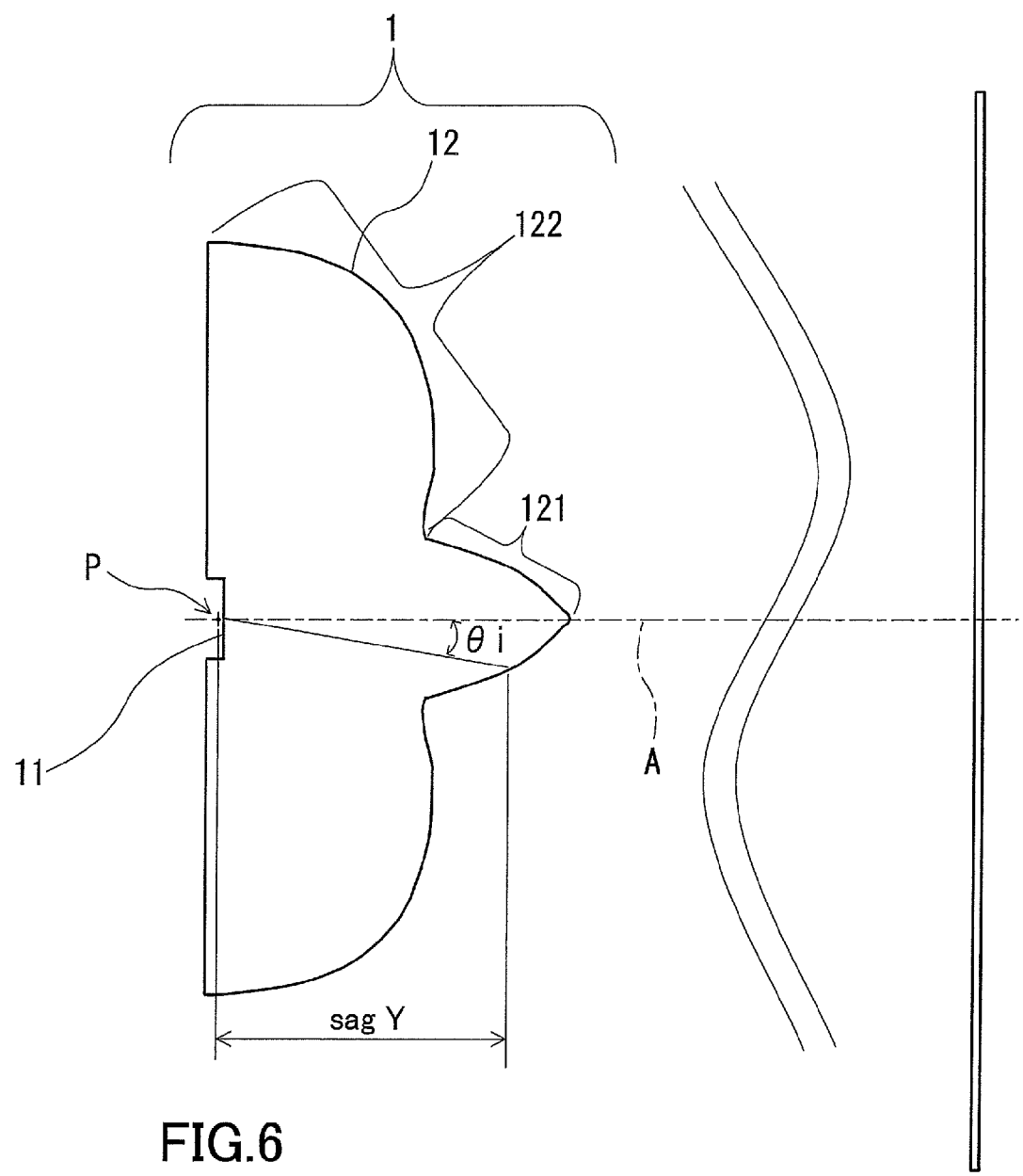
FIG. 6 is a diagram for explaining Example 1 of the lighting device according to the second embodiment of the present invention.

FIG. 6 is a schematic diagram of a lighting device in Example 1 according to the second embodiment of the present invention. Example 1 is an example of a lighting device designed to widen the range of transmission directions for light from a 0.5 mm cubic-shaped light emitting diode as a light source. In FIG. 6, θi is an angle between the optical axis A and a straight line connecting the position of the light source (starting point P) on the optical axis A and an arbitrary point on the light exit surface 12. This angle θi is equal to the angle between the optical axis A and the light ray emitted from the starting point P, as described in the first embodiment. Furthermore, in FIG. 6, sagY is a distance along the optical axis A between the light source position (starting point P) on the optical axis A and the above-mentioned arbitrary point on the light exit surface.

Table 1 below shows specific numerical values in Example 1.

TABLE 1

| θi (deg) | sagY (min) |
|---|---|
| 0.000 | 2.288 |
| 0.251 | 2.286 |
| 0.503 | 2.280 |
| 0.757 | 2.271 |
| 1.013 | 2.262 |
| 1.272 | 2.252 |
| 1.534 | 2.241 |
| 1.797 | 2.231 |
| 2.064 | 2.220 |
| 2.333 | 2.209 |
| 2.604 | 2.199 |
| 2.877 | 2.189 |
| 3.153 | 2.178 |
| 3.431 | 2.168 |
| 3.712 | 2.158 |
| 3.996 | 2.147 |
| 4.282 | 2.137 |
| 4.571 | 2.126 |
| 4.863 | 2.115 |
| 5.159 | 2.104 |
| 5.459 | 2.093 |
| 5.762 | 2.081 |
| 6.070 | 2.069 |
| 6.383 | 2.056 |
| 6.702 | 2.043 |
| 7.026 | 2.029 |
| 7.356 | 2.014 |
| 7.694 | 1.999 |
| 8.039 | 1.982 |
| 8.393 | 1.965 |
| 8.756 | 1.948 |
| 9.129 | 1.929 |

TABLE 1-continued

| θi (deg) | sagY (min) |
|---|---|
| 9.513 | 1.910 |
| 9.909 | 1.889 |
| 10.317 | 1.868 |
| 10.740 | 1.845 |
| 11.177 | 1.822 |
| 11.630 | 1.798 |
| 12.099 | 1.773 |
| 12.587 | 1.747 |
| 13.095 | 1.720 |
| 13.622 | 1.692 |
| 14.171 | 1.663 |
| 14.743 | 1.634 |
| 15.338 | 1.604 |
| 15.957 | 1.574 |
| 16.602 | 1.543 |
| 17.273 | 1.512 |
| 17.969 | 1.480 |
| 18.692 | 1.448 |
| 19.440 | 1.417 |
| 20.214 | 1.385 |
| 21.011 | 1.354 |
| 21.523 | 1.344 |
| 21.945 | 1.340 |
| 22.361 | 1.337 |
| 22.769 | 1.334 |
| 23.168 | 1.332 |
| 23.558 | 1.330 |
| 23.937 | 1.329 |
| 24.298 | 1.329 |
| 24.632 | 1.330 |
| 24.961 | 1.332 |
| 25.288 | 1.333 |
| 25.612 | 1.335 |
| 25.933 | 1.337 |
| 26.251 | 1.338 |
| 26.566 | 1.340 |
| 26.878 | 1.342 |
| 27.188 | 1.343 |
| 27.494 | 1.345 |
| 27.798 | 1.347 |
| 28.099 | 1.349 |
| 28.397 | 1.350 |
| 28.692 | 1.352 |
| 28.986 | 1.354 |
| 29.276 | 1.356 |
| 29.564 | 1.357 |
| 29.850 | 1.359 |
| 30.133 | 1.361 |
| 30.414 | 1.363 |
| 30.693 | 1.365 |
| 30.970 | 1.366 |
| 31.245 | 1.368 |
| 31.518 | 1.370 |
| 31.789 | 1.372 |
| 32.058 | 1.373 |
| 32.325 | 1.375 |
| 32.591 | 1.377 |
| 32.855 | 1.378 |
| 33.117 | 1.380 |
| 33.378 | 1.381 |
| 33.638 | 1.383 |
| 33.896 | 1.384 |
| 34.153 | 1.386 |
| 34.409 | 1.387 |
| 34.664 | 1.388 |
| 34.918 | 1.390 |
| 35.171 | 1.391 |
| 35.422 | 1.392 |
| 35.673 | 1.393 |
| 35.924 | 1.394 |
| 36.173 | 1.395 |
| 36.422 | 1.396 |
| 36.670 | 1.397 |
| 36.918 | 1.398 |
| 37.165 | 1.398 |
| 37.411 | 1.399 |
| 37.657 | 1.400 |
| 37.903 | 1.400 |

TABLE 1-continued

| θi (deg) | sagY (min) |
|---|---|
| 38.148 | 1.400 |
| 38.393 | 1.401 |
| 38.638 | 1.401 |
| 38.883 | 1.401 |
| 39.127 | 1.401 |
| 39.371 | 1.401 |
| 39.614 | 1.401 |
| 39.858 | 1.401 |
| 40.101 | 1.401 |
| 40.344 | 1.401 |
| 40.587 | 1.401 |
| 40.830 | 1.400 |
| 41.073 | 1.400 |
| 41.316 | 1.399 |
| 41.558 | 1.399 |
| 41.800 | 1.398 |
| 42.042 | 1.397 |
| 42.284 | 1.396 |
| 42.526 | 1.396 |
| 42.768 | 1.395 |
| 43.009 | 1.394 |
| 43.250 | 1.393 |
| 43.491 | 1.391 |
| 43.732 | 1.390 |
| 43.972 | 1.389 |
| 44.213 | 1.388 |
| 44.453 | 1.386 |
| 44.692 | 1.385 |
| 44.932 | 1.383 |
| 45.171 | 1.382 |
| 45.410 | 1.380 |
| 45.648 | 1.378 |
| 45.887 | 1.377 |
| 46.125 | 1.375 |
| 46.362 | 1.373 |
| 46.600 | 1.371 |
| 46.837 | 1.369 |
| 47.073 | 1.367 |
| 47.310 | 1.365 |
| 47.546 | 1.363 |
| 47.782 | 1.361 |
| 48.018 | 1.359 |
| 48.253 | 1.357 |
| 48.488 | 1.354 |
| 48.723 | 1.352 |
| 48.958 | 1.349 |
| 49.193 | 1.347 |
| 49.428 | 1.344 |
| 49.663 | 1.342 |
| 49.898 | 1.339 |
| 50.133 | 1.336 |
| 50.369 | 1.333 |
| 50.604 | 1.330 |
| 50.840 | 1.327 |
| 51.076 | 1.324 |
| 51.313 | 1.321 |
| 51.551 | 1.318 |
| 51.788 | 1.315 |
| 52.027 | 1.311 |
| 52.267 | 1.308 |
| 52.507 | 1.304 |
| 52.748 | 1.300 |
| 52.991 | 1.297 |
| 53.235 | 1.293 |
| 53.479 | 1.288 |
| 53.726 | 1.284 |
| 53.973 | 1.280 |
| 54.223 | 1.275 |
| 54.474 | 1.271 |
| 54.726 | 1.266 |
| 54.981 | 1.261 |
| 55.237 | 1.256 |
| 55.495 | 1.251 |
| 55.756 | 1.246 |
| 56.018 | 1.240 |
| 56.283 | 1.235 |
| 56.550 | 1.229 |
| 56.819 | 1.223 |
| 57.091 | 1.217 |
| 57.365 | 1.210 |
| 57.641 | 1.204 |
| 57.920 | 1.197 |
| 58.202 | 1.190 |
| 58.486 | 1.183 |
| 58.773 | 1.176 |
| 59.062 | 1.169 |
| 59.354 | 1.161 |
| 59.649 | 1.154 |
| 59.946 | 1.146 |
| 60.246 | 1.138 |
| 60.548 | 1.129 |
| 60.854 | 1.121 |
| 61.162 | 1.112 |
| 61.473 | 1.103 |
| 61.787 | 1.094 |
| 62.105 | 1.085 |
| 62.425 | 1.076 |
| 62.749 | 1.066 |
| 63.076 | 1.056 |
| 63.408 | 1.046 |
| 63.743 | 1.036 |
| 64.084 | 1.025 |
| 64.429 | 1.014 |
| 64.780 | 1.003 |
| 65.137 | 0.992 |
| 65.501 | 0.980 |
| 65.874 | 0.967 |
| 66.255 | 0.955 |
| 66.646 | 0.941 |
| 67.049 | 0.927 |
| 67.465 | 0.913 |
| 67.897 | 0.898 |
| 68.345 | 0.881 |
| 68.812 | 0.864 |
| 69.302 | 0.846 |
| 69.817 | 0.827 |
| 70.360 | 0.807 |
| 70.936 | 0.784 |
| 71.548 | 0.761 |
| 72.202 | 0.735 |
| 72.902 | 0.707 |
| 73.655 | 0.677 |
| 74.468 | 0.645 |
| 75.348 | 0.609 |
| 76.303 | 0.570 |
| 77.342 | 0.528 |
| 78.475 | 0.481 |
| 79.713 | 0.430 |
| 81.068 | 0.374 |
| 82.552 | 0.312 |
| 84.179 | 0.245 |
| 85.961 | 0.170 |
| 87.914 | 0.088 |
| 87.914 | 0.088 |

Figure 7:
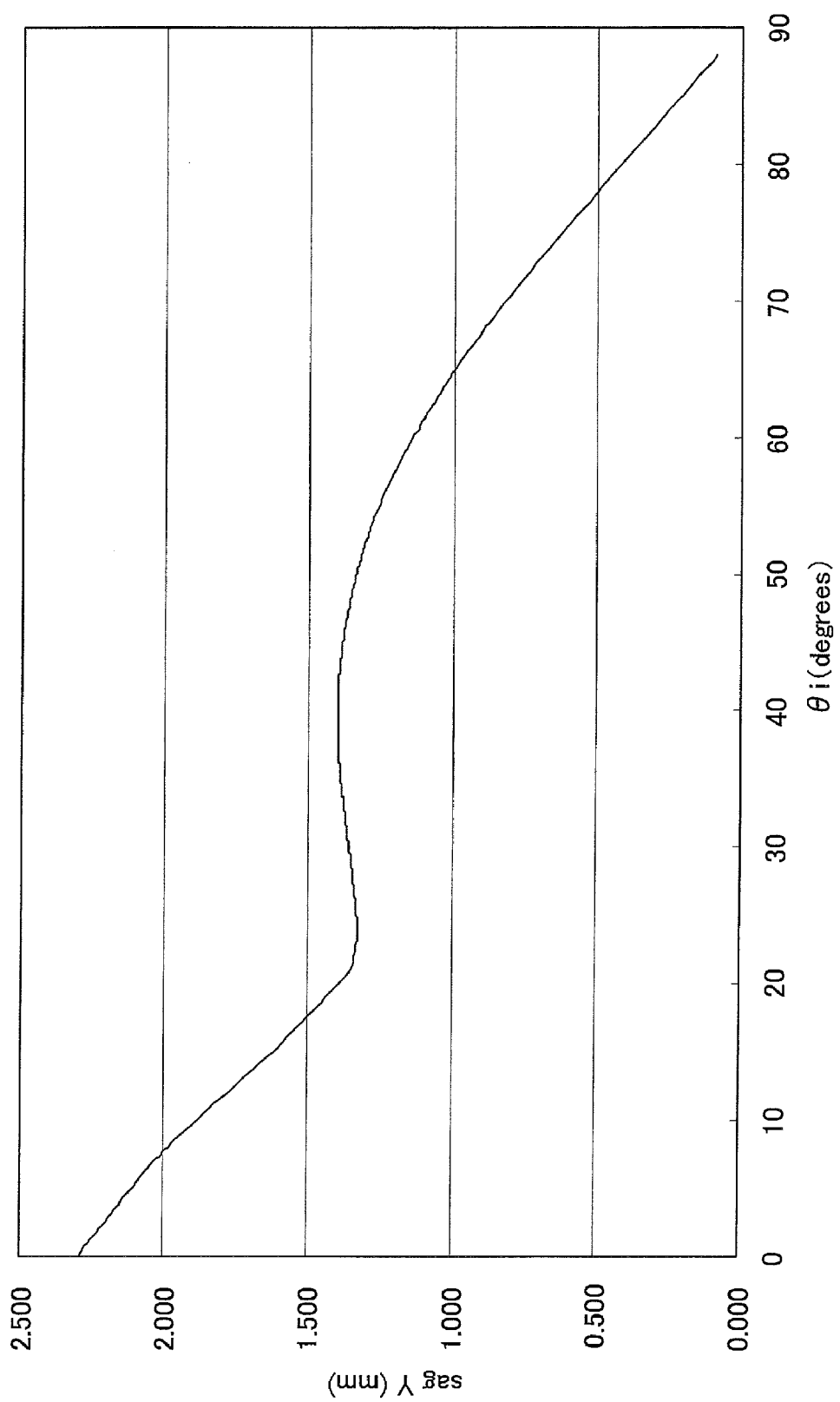
FIG. 7 is a graph showing a relationship between θi and sagY, which represent the shape of the light exit surface in Example 1 of the lighting device according to the second embodiment of the present invention (i.e., a graph obtained by plotting the values in Table 1).

FIG. 7 is a graph obtained by plotting the values of θi and sagY in Table 1.

Figure 15B:
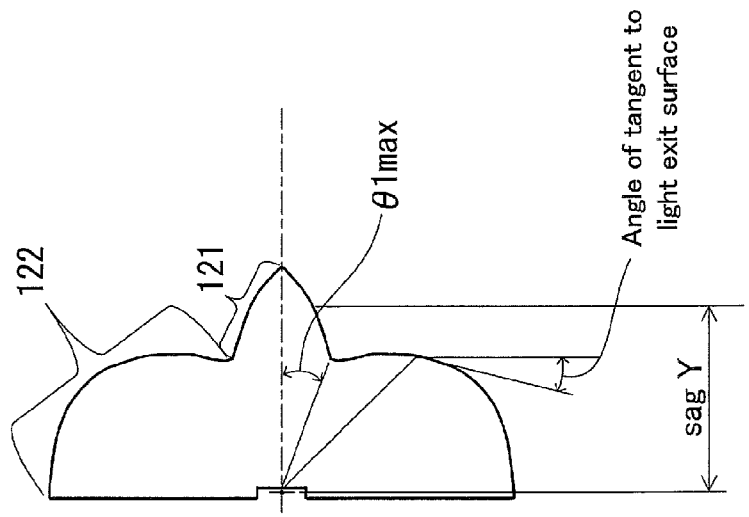
FIG. 15B is a diagram for explaining an angle of a tangent to the light exit surface.
Figure 15A:
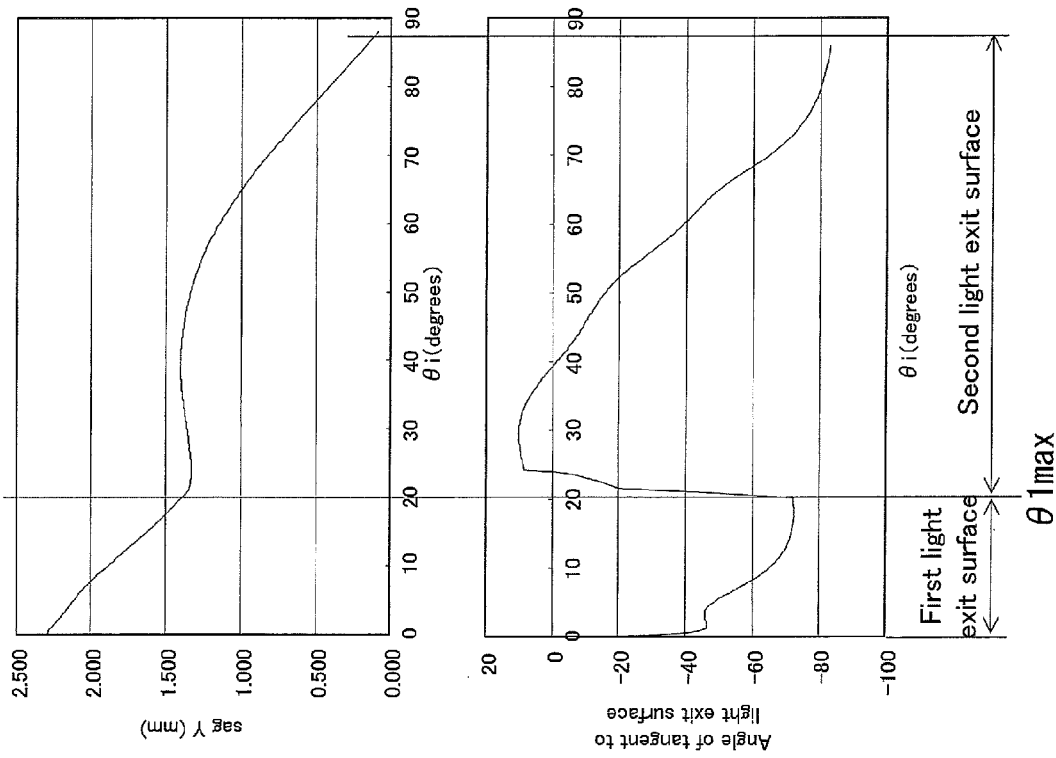
FIG. 15A is a graph showing a relationship between θi and sagY and an angle of a tangent to the light exit surface in Example 1 of the lighting device according to the second embodiment of the present invention.
Figure 16A:
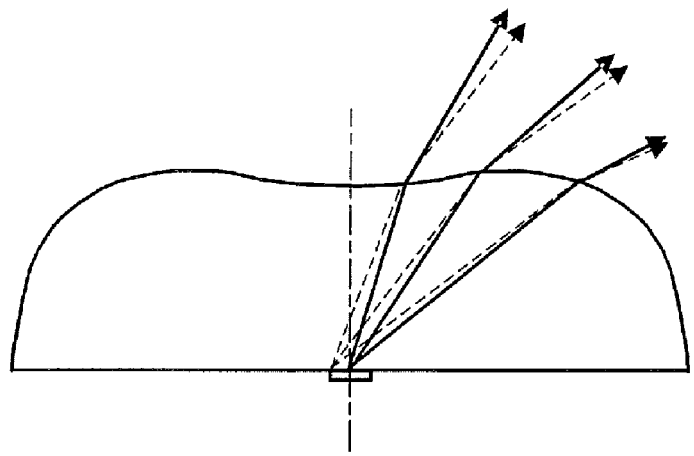
FIG. 16A is a diagram showing optical paths in a conventional lens for illumination.
Figure 16B:
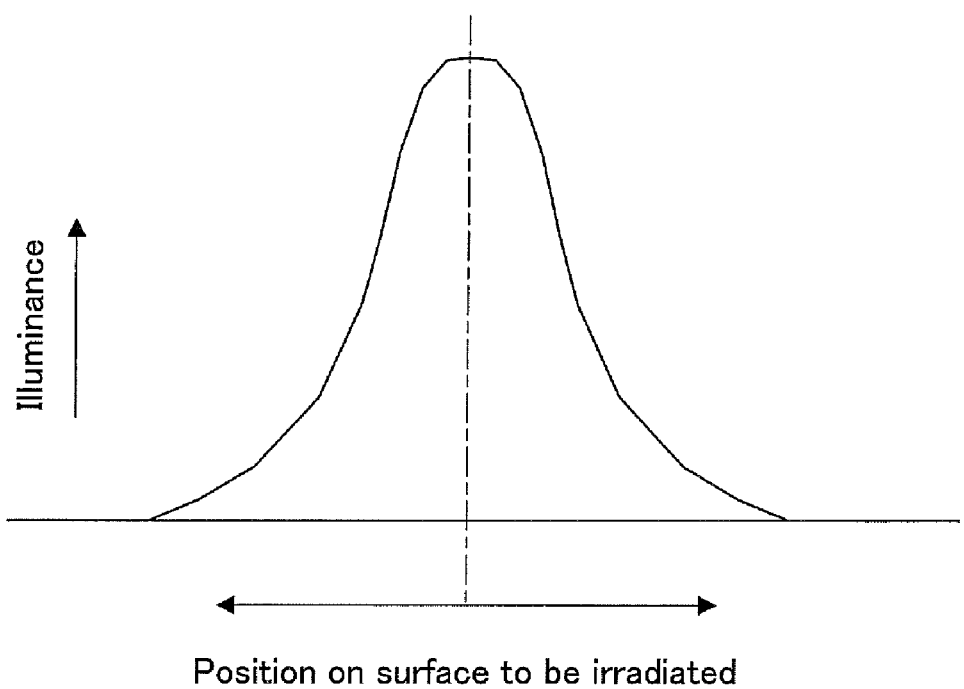
FIG. 16B shows an illuminance distribution obtained when the conventional lens for illumination is used.
Figure 17A:
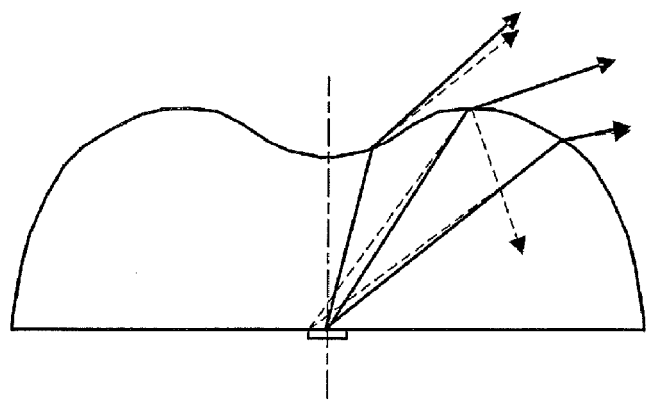
FIG. 17A and FIG. 17B are diagrams for explaining the limit of the conventional lens for illumination.
Figure 17B:
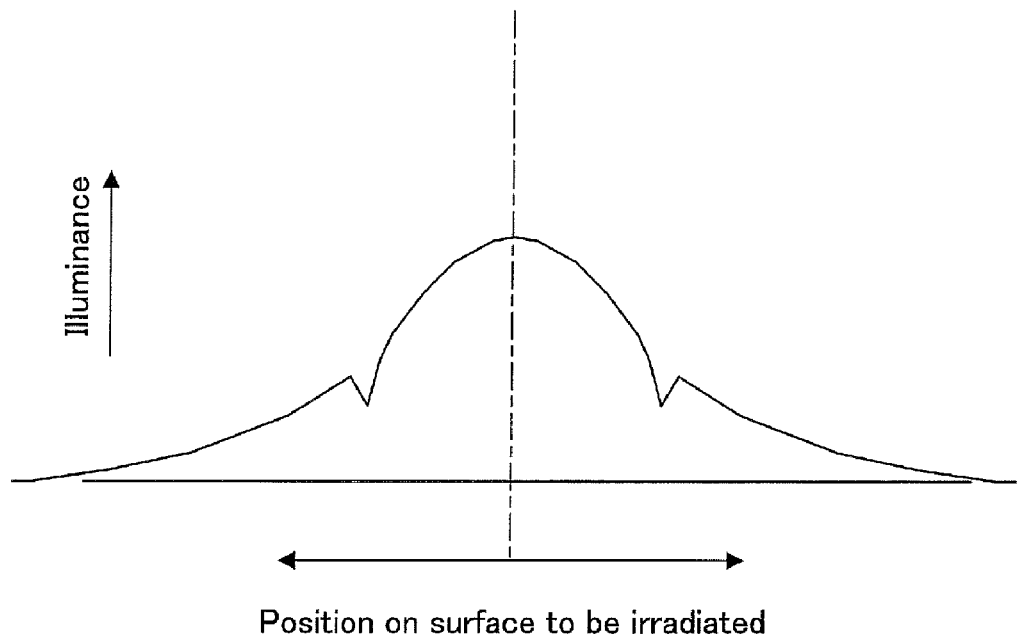

The range of the first light exit surface 121 is described with reference to FIG. 15. FIG. 15A is a graph showing a relationship between θi and sagY and an angle of a tangent to the light exit surface, and FIG. 15B is a diagram for explaining an angle of a tangent to the light exit surface. An angle of a tangent is 0 degree when the tangent is orthogonal to the optical axis, and is an angle that increases toward the outer periphery of the lens in a cross section including the optical axis as the angle θi increases outwardly from the optical axis. The sign of the angle of the tangent is negative if it increases toward the light source side from, and positive if it increases toward the opposite side. The first light exit surface 121 is a convex near the optical axis and an area where the angle θi is in the range of 0 to 21 degrees. In this area, the value of sagY decreases as the value of θi increases as shown in an upper graph of FIG. 15A, and the angle of the tangent decreases in the negative direction as the value of θi increases as shown in a lower graph of FIG. 15A.

The refractive index of the transparent material constituting the lens in Example 1 is 1.41. Therefore, if this value of 1.41 is substituted into the inequality (1) described in the first embodiment, the following value is obtained:

$$\theta1\max < 90° - \sin^{-1}(1/nd) = 90° - \sin^{-1}(1/1.41)$$
$$= 44.828°$$

The range of the first light exit surface 121 is defined with the angle θi of 44.825 degrees or less in the polar coordinates from the light source based on the inequality (1). Since the θ1max is 21 degrees in Example 1, this value satisfies the inequality (1).

If the nd=1.41 is substituted into the inequality (2) described in the first embodiment, the following value is obtained:

$$\theta p - \theta i > \sin^{-1}(1/nd) = \sin^{-1}(1/1.41)$$
$$= 45.17°$$

Figure 8:
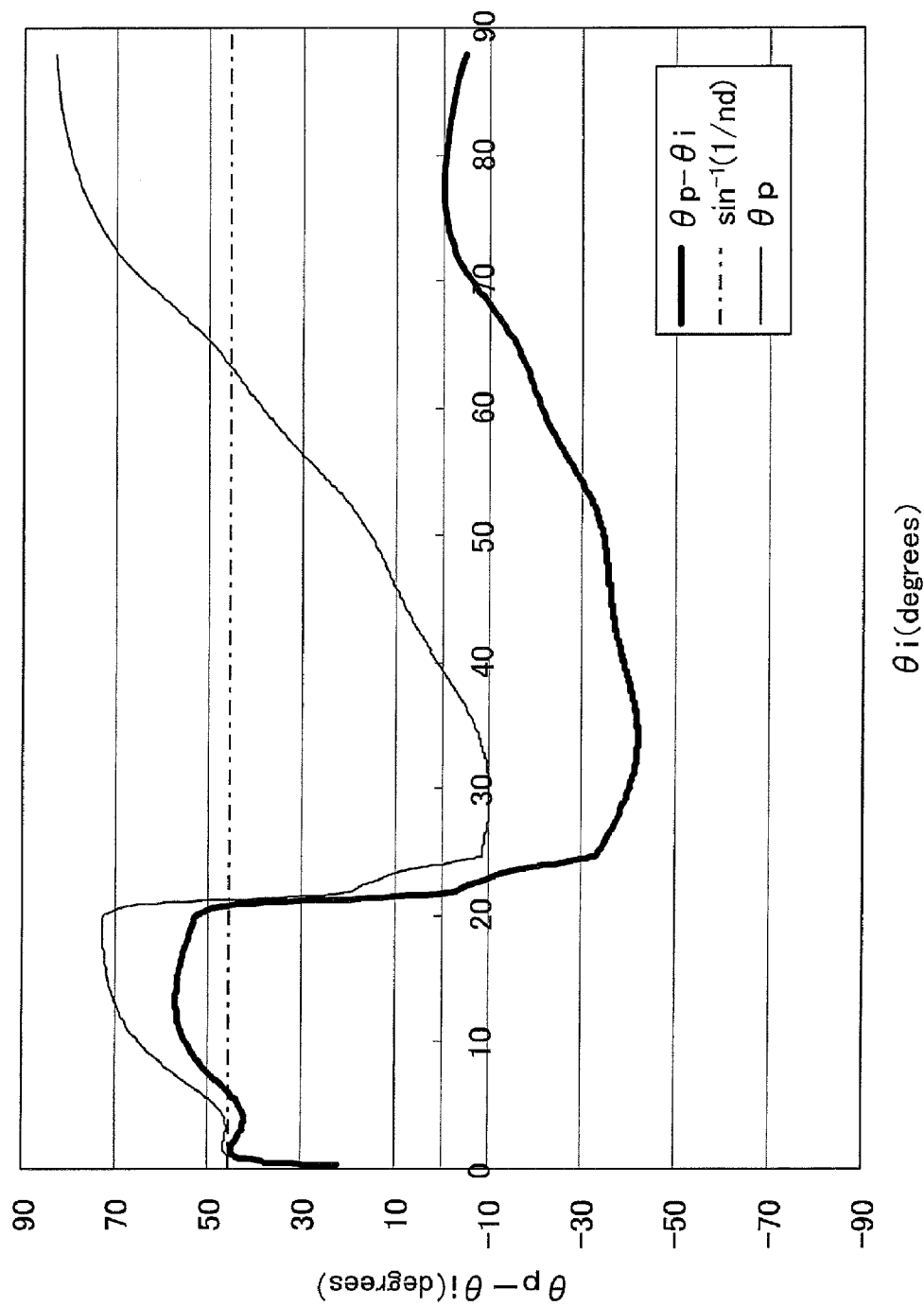
FIG. 8 is a graph showing relationships between θi and θp, θp−θi, $\sin^{-1}(1/nd)$, which represent the shape of the light exit surface in Example 1 of the lighting device according to the second embodiment of the present invention.

In Example 1, θf is set to 6 degrees. FIG. 8 is a graph showing the relationship between θi and θp−θi in Example 1. As shown in FIG. 8, in Example 1, θp−θi exceeds 45.17 degrees when θi is in the range of 6 to 21 degrees, which satisfies the inequality (2).

Figure 9:
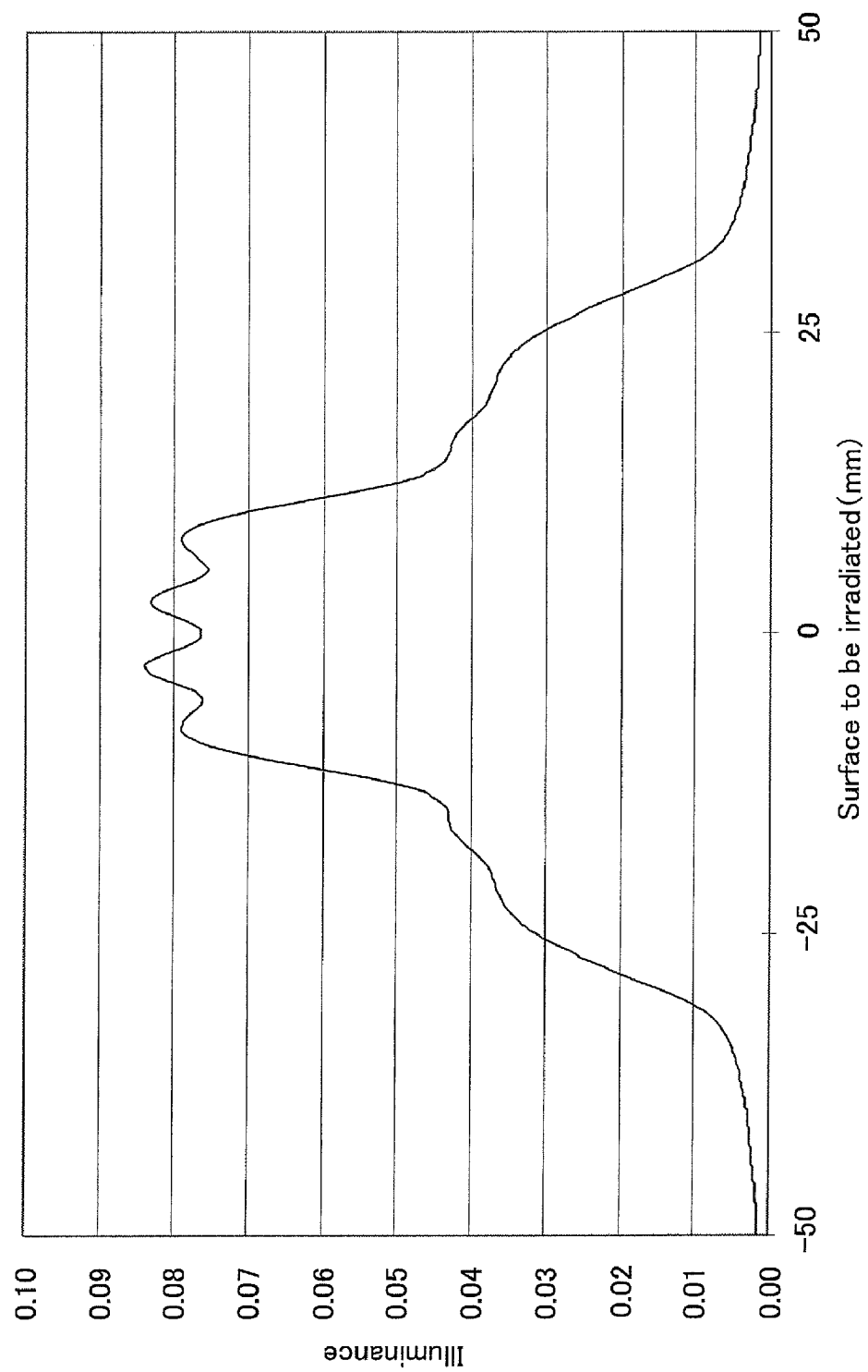
FIG. 9 shows an illuminance distribution in Example 1 of the lighting device according to the second embodiment of the present invention.
Figure 10:
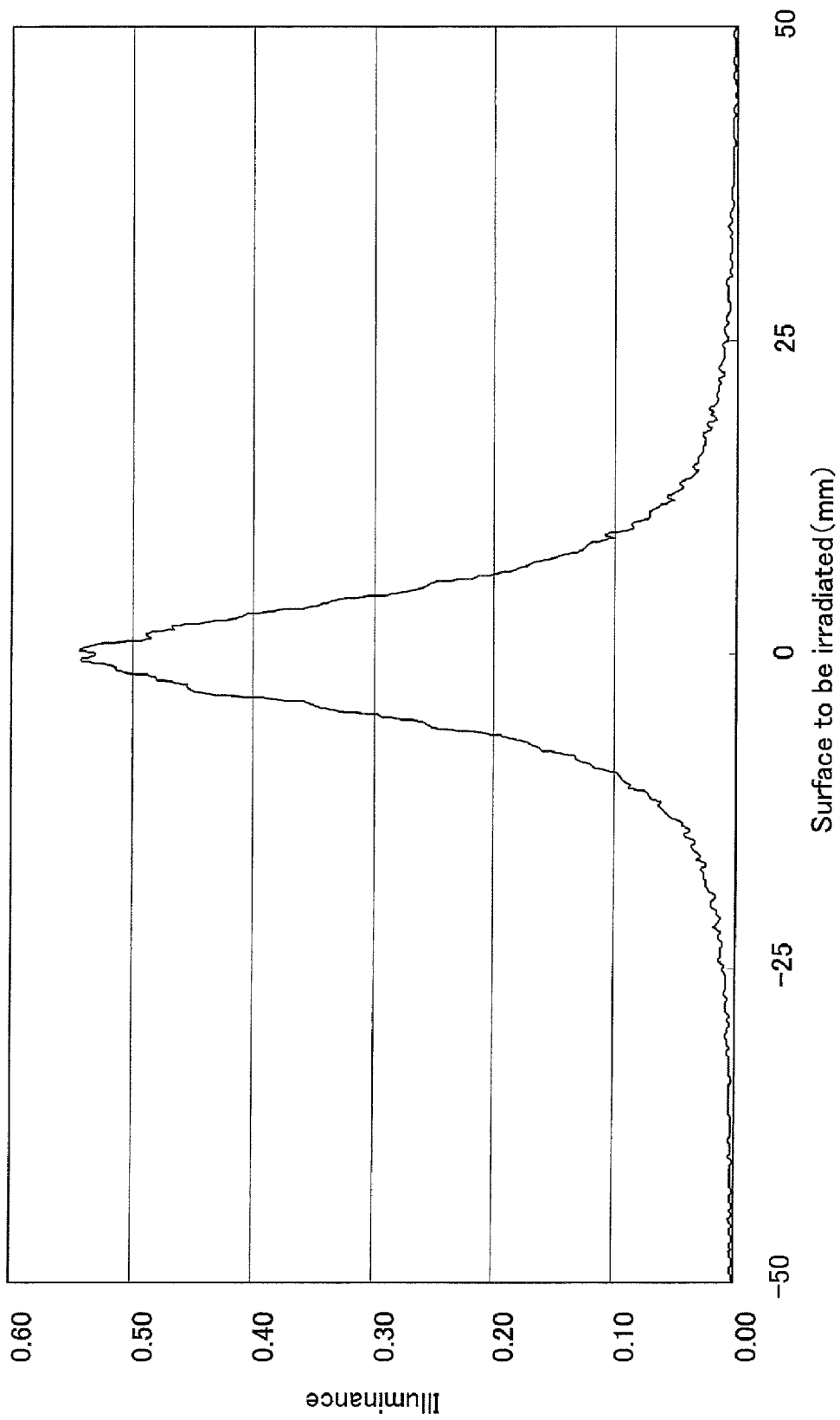
FIG. 10 shows an illuminance distribution obtained when only light emitting diodes are used to confirm the effects of Example 1.

FIG. 9 shows the illuminance distribution on the surface to be irradiated obtained by calculation assuming that the lens for illumination and the light emitting diode in Example 1 are used and the surface to be irradiated is placed at a distance of 8 mm from the light emitting diode. FIG. 10 shows the illuminance distribution on the surface to be irradiated obtained by calculation assuming that only the same light emitting diode as in FIG. 9 is used and the surface to be irradiated is placed at a distance of 8 mm from the light emitting diode. A comparison between FIG. 9 and FIG. 10 shows that the lens for illumination is effective in reducing the illuminance on the optical axis to about one seventh and increasing the illuminated area of the surface to be irradiated by the reduced illuminance.

Third Embodiment

Figure 11:
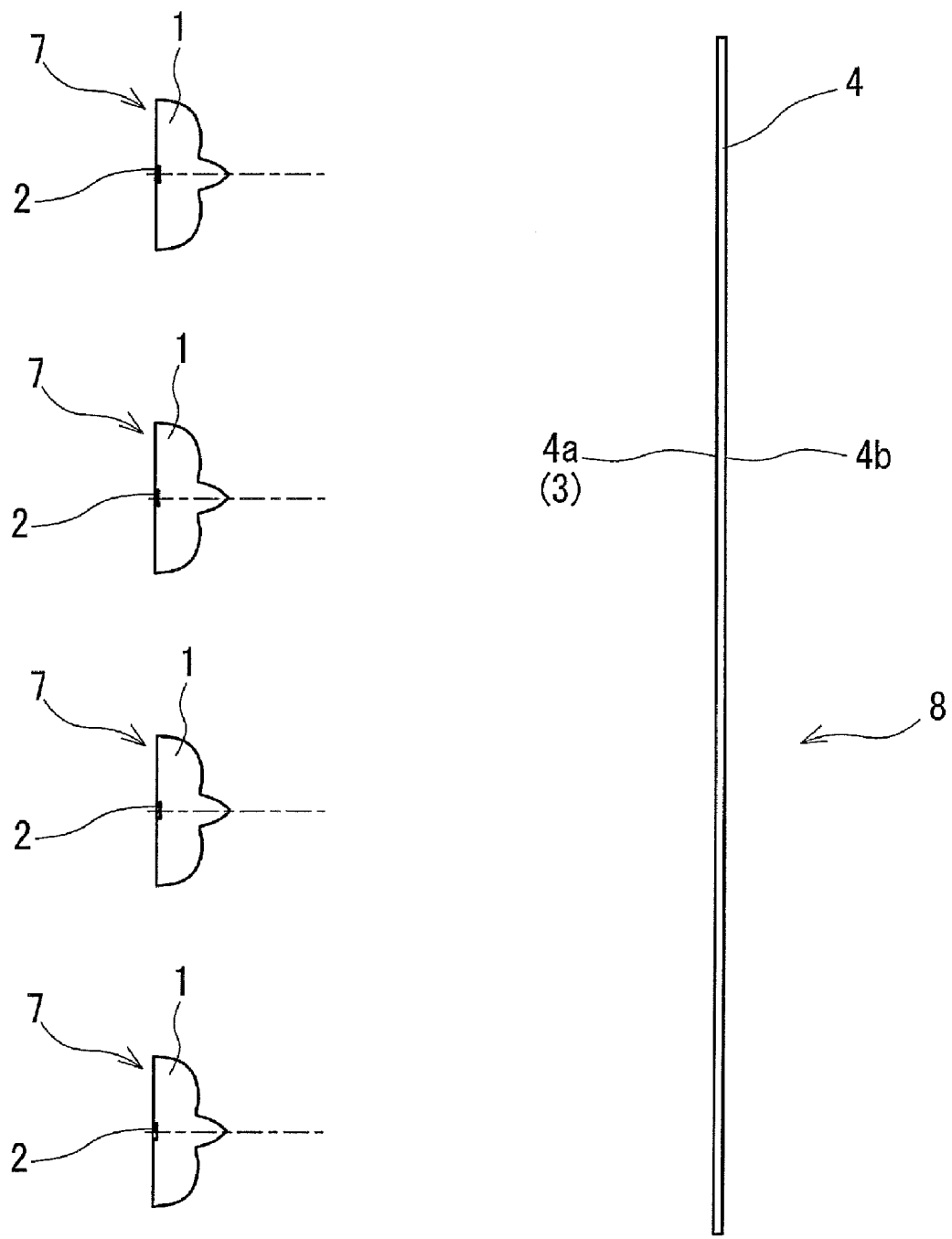
FIG. 11 is a schematic diagram of a surface light source according to a third embodiment of the present invention.

FIG. 11 is a schematic diagram of a surface light source 8 according to a third embodiment of the present invention. This surface light source 8 includes a plurality of lighting devices 7 described in the second embodiment arranged in a plane, and a diffusing plate 4 disposed to cover the plurality of lighting devices 7. The lighting devices 7 may be arranged in a matrix. They may be arranged in a staggered manner.

The lighting device 7 emits light to one surface 4a of the diffusing plate 4. That is, the one surface 4a of the diffusing plate 4 is the surface to be irradiated 3 that has been described in the first and second embodiments. The diffusing plate 4 emits the light received on its one surface 4a from the other surface 4b in a diffused manner. The lighting devices 7 emit light individually toward a large area of the one surface 4a of the diffusing plate 4 so that the one surface 4a has a uniform illuminance, and upon receiving this light, the diffusing plate 4 emits the light diffusely. As a result, the surface light source capable of emitting light having less uneven brightness in the plane is obtained.

Figure 12:
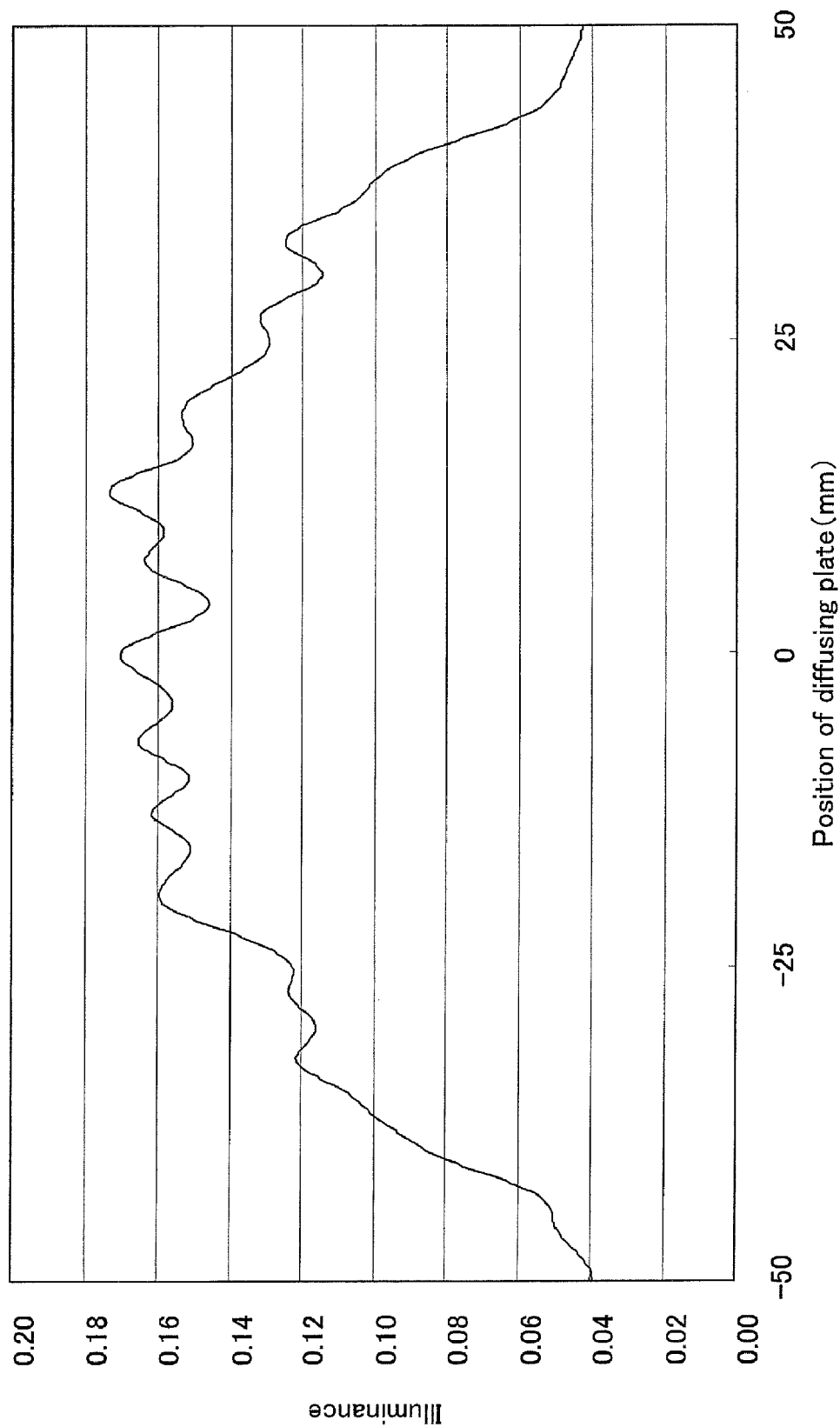
FIG. 12 shows an illuminance distribution obtained when the lighting device of Example 1 is used in the surface light source according to the third embodiment of the present invention.
Figure 13:
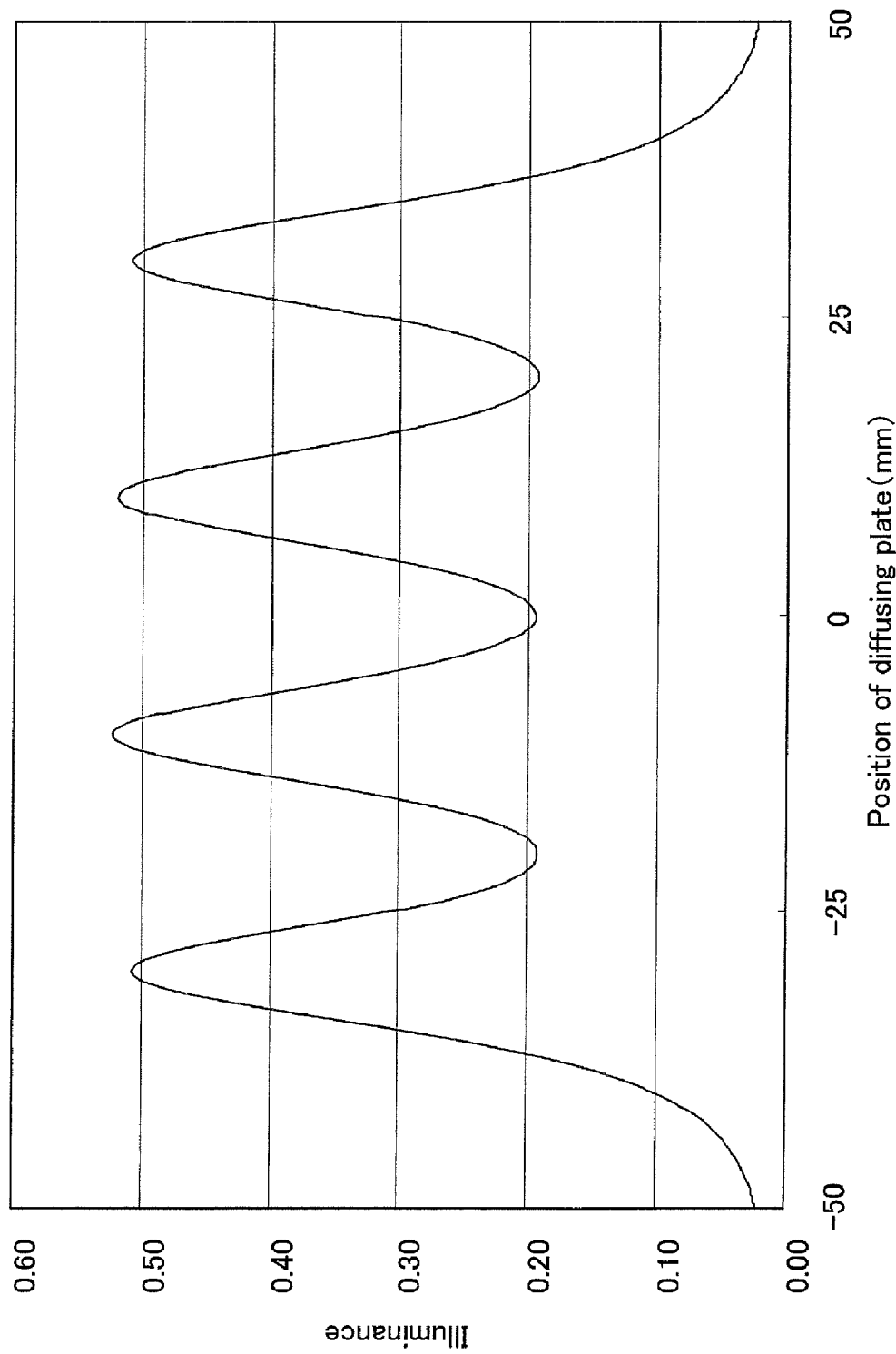
FIG. 13 shows an illuminance distribution obtained when a surface light source including lighting devices each composed of only a light emitting diode is used to confirm the effects of Example 1.

FIG. 12 shows the illuminance distribution on the light entrance surface (one surface on the side of the lighting device) of the diffusing plate obtained by calculation assuming that four lighting devices of Example 1 each including the lens for illumination and the light emitting diode are arranged in a line at a pitch of 20 mm and the diffusing plate is placed at a distance of 8 mm from the light emitting diodes. Small fluctuations in the illuminance distribution are attributed to a small number of light rays to be evaluated in calculating the illuminances. FIG. 13 shows the illuminance distribution on the light entrance surface of the diffusing plate obtained by calculation assuming that four light emitting diodes only are arranged in a line with a pitch of 20 mm and the diffusing plate is placed at a distance of 8 mm from the light emitting diodes. A comparison between FIG. 12 and FIG. 13 shows that the lens for illumination is effective in illuminating the light entrance surface of the diffusing plate uniformly.

Fourth Embodiment

Figure 14:
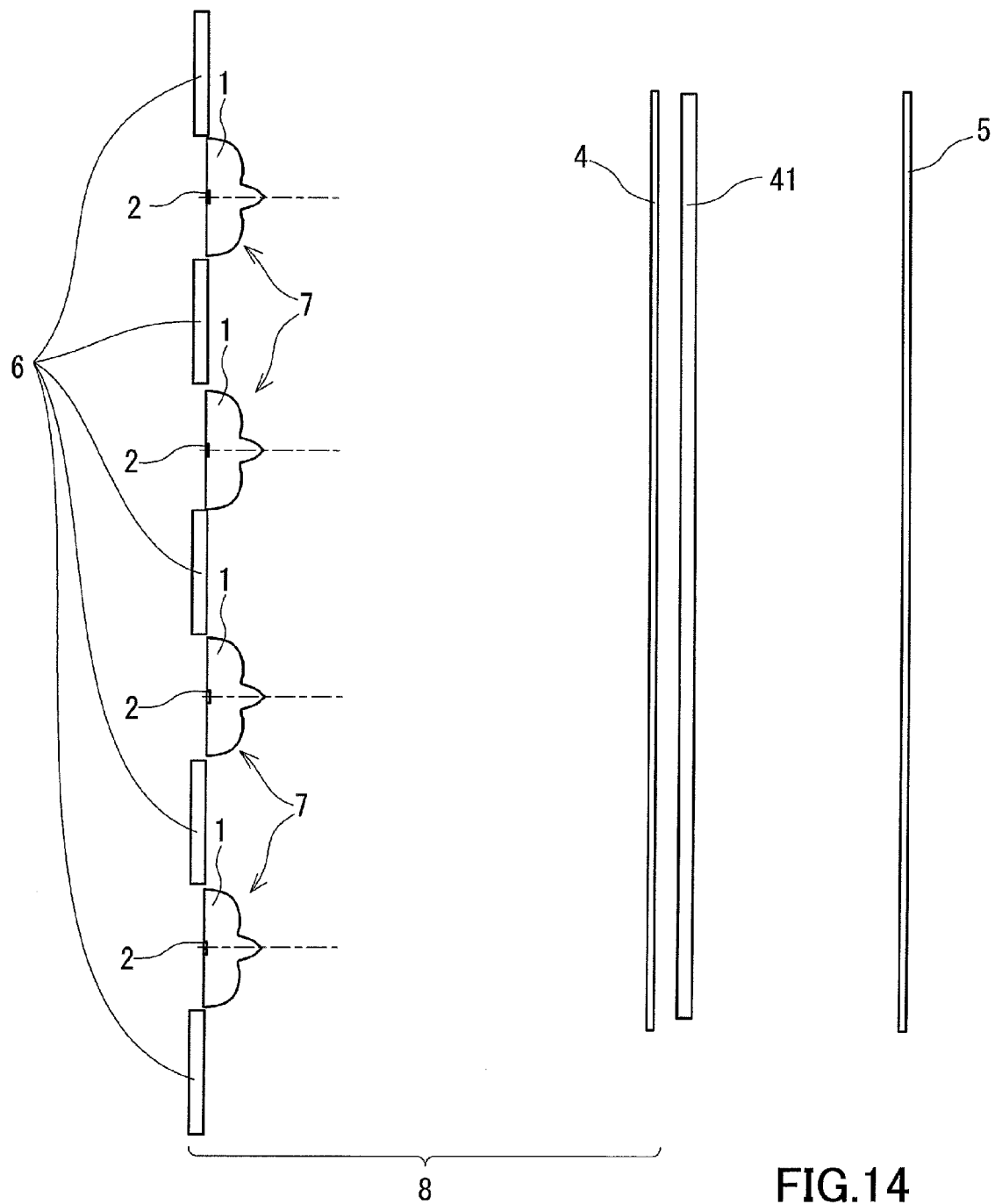
FIG. 14 is a schematic diagram of a liquid-crystal display apparatus according to a fourth embodiment of the present invention.

FIG. 14 is a schematic diagram of a liquid-crystal display apparatus according to a fourth embodiment of the present invention. This liquid-crystal display apparatus includes a liquid-crystal panel 5, and a surface light source 8 described in the third embodiment disposed behind the liquid-crystal panel 5.

A plurality of lighting devices 7 each including the light emitting diode 2 and the lens for illumination 1 are arranged in a plane, and the diffusing plate 4 is illuminated by these lighting devices 7. The underside (one surface) of the diffusing plate 4 is irradiated with the light emitted from the lighting devices 7 to have a uniform illuminance, and then the light is diffused by the diffusing plate 4. Thus, the liquid-crystal panel 5 is illuminated by the diffused light.

It is preferable that a sheet 41 such as a diffusing sheet or a prism sheet is disposed between the liquid-crystal panel 5 and the surface light source 8 and that diffuse reflection plates 6 are disposed in the areas where the lighting devices are not disposed, as shown in FIG. 14. The light emitted from the lighting device 7 is diffused by the diffusing plate 4 so that the diffuse light returns to the lighting device side or passes through the diffusing plate 4. The light that has returned to the lighting device side and struck the diffuse reflection plate 6 is reflected at the diffuse reflection plate 6 and again enters the diffusing plate 4. The light that has passed through the diffusing plate 4 further is diffused by the sheet 41 and illuminates the liquid-crystal panel 5.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A lens for illumination for spreading light emitted from a light source so that a surface to be irradiated is irradiated with the spread light, the lens comprising:
    a light entrance surface through which the light emitted from the light source enters the lens; and
    a light exit surface through which the light that has entered the lens exits the lens, the light exit surface being axisymmetric with respect to an optical axis, wherein the light exit surface has a first light exit surface and a second light exit surface, the first light exit surface projecting toward a vertex on the optical axis, and the second light exit surface extending outwardly and continuously from a periphery of the first light exit surface to form a convex, when a position of the light source on the optical axis is defined as a starting point, the first light exit surface has a shape allowing light that has been emitted from the starting point at an angle of a specified value or more with respect to the optical axis and reached the first light exit surface to reach the surface to be irradiated by totally reflecting the emitted light at a first point thereon reached by the emitted light first and then refracting the totally reflected light at a second point thereon reached by the emitted light after being totally reflected, and the second light exit surface has a shape allowing light that has been emitted from the starting point and reached the second light exit surface to reach the surface to be irradiated by refracting the emitted light at a point thereon reached by the emitted light.

2. The lens for illumination according to claim 1, wherein in the case where an angle between the optical axis and a light ray of the light emitted from the starting point is denoted as $\theta i$, an angle between the optical axis and a normal to the light exit surface at a point of intersection of the light ray and the light exit surface is denoted as $\theta p$, and a refractive index of the lens is denoted as nd, when the point of intersection is located on the first light exit surface and the angle $\theta i$ is the specified value or more, the following inequality is satisfied:

$\theta p - \theta i > \sin^{-1}(1/nd)$.

3. The lens for illumination according to claim 1, wherein the angle of the specified value is approximately 0 degree.

4. The lens for illumination according to claim 1, wherein the angle of the specified value is 3 to 7 degrees, and the first light exit surface has a shape allowing light that has been emitted from the starting point at an angle of less than the specified value with respect to the optical axis and reached the first light exit surface to reach the surface to be irradiated by refracting the emitted light at a point thereon reached by the emitted light.

5. The lens for illumination according to claim 1, wherein in the case where an angle between the optical axis and a line connecting the starting point and a point on the first light exit surface is denoted as $\theta 1$, a maximum value of the angle $\theta 1$ is denoted as $\theta 1 max$, and a refractive index of the lens is denoted as nd, the following inequality is satisfied:

$\theta 1 max < 90° - \sin^{-1}(1/nd)$.

6. The lens for illumination according to claim 5, wherein the angle $\theta 1 max$ is 15 to 25 degrees.

7. A lighting device comprising:
a light emitting diode for emitting light; and
a lens for illumination for spreading light emitted from the light emitting diode so that a surface to be irradiated is irradiated with the spread light,
wherein the lens for illumination is the lens for illumination according to claim 1.

8. A surface light source comprising:
a plurality of lighting devices arranged in a plane; and
a diffusing plate disposed to cover the plurality of lighting devices, the diffusing plate being configured to receive on one surface thereof light emitted from the plurality of lighting devices and to emit the light from the other surface thereof in a diffused manner,
wherein each of the plurality of lighting devices is the lighting device according to claim 7.

9. A liquid-crystal display apparatus comprising:
a liquid-crystal panel; and
the surface light source according to claim 8 disposed behind the liquid-crystal panel.

* * * * *